United States Patent
Hall et al.

(10) Patent No.: US 11,934,425 B1
(45) Date of Patent: Mar. 19, 2024

(54) SYNCHRONIZING A CENTRALIZED STATE ON A DISTRIBUTED CHAIN DATABASE WITH AN OFF-CHAIN STATE TO IMPROVE TRADE AUTHORIZATION PRACTICES

(71) Applicant: Harbor Technologies, LLC, Palo Alto, CA (US)

(72) Inventors: Ryan Anthony Hall, San Francisco, CA (US); Robert Paul Remeika, Jr., Walnut Creek, CA (US)

(73) Assignee: Harbor Technologies, LLC, Palo Alto, CA (US)

( * ) Notice: Subject to any disclaimer, the term of this patent is extended or adjusted under 35 U.S.C. 154(b) by 116 days.

(21) Appl. No.: 16/267,204

(22) Filed: Feb. 4, 2019

(51) Int. Cl.
  *G06F 16/27* (2019.01)
  *G06F 16/23* (2019.01)
  *G06F 16/2455* (2019.01)

(52) U.S. Cl.
  CPC ........ *G06F 16/275* (2019.01); *G06F 16/2379* (2019.01); *G06F 16/24564* (2019.01)

(58) Field of Classification Search
  CPC ............. G06F 16/275; G06F 16/24564; G06F 16/2379
  See application file for complete search history.

(56) References Cited

U.S. PATENT DOCUMENTS

| | | | | |
|---|---|---|---|---|
| 2004/0224674 A1* | 11/2004 | O'Farrell | ................ | G06F 16/27 455/418 |
| 2017/0243222 A1* | 8/2017 | Balasubramanian | ....................... | G06Q 20/4014 |
| 2017/0300627 A1* | 10/2017 | Giordano | ............ | G06F 21/6245 |
| 2019/0005469 A1* | 1/2019 | Dhupkar | ................ | G06Q 20/06 |
| 2019/0013948 A1* | 1/2019 | Mercuri | ............... | G06F 11/3072 |
| 2019/0020729 A1* | 1/2019 | Chen | ........................ | H04L 67/10 |
| 2019/0036887 A1* | 1/2019 | Miller | ................... | H04L 63/104 |
| 2019/0129895 A1* | 5/2019 | Middleton | .............. | H04L 63/12 |
| 2019/0333033 A1* | 10/2019 | Finlow-Bates | .... | G06Q 20/3829 |
| 2019/0340716 A1* | 11/2019 | Cella | ..................... | G06Q 50/184 |
| 2020/0042625 A1* | 2/2020 | Balaraman | ............ | G06F 16/258 |
| 2020/0065301 A1* | 2/2020 | Funke | ................... | G06F 16/245 |
| 2020/0076571 A1* | 3/2020 | Natarajan | ........... | G06F 16/2246 |
| 2020/0104835 A1* | 4/2020 | Day | .................... | G06Q 30/0206 |
| 2020/0133257 A1* | 4/2020 | Cella | .................. | G05B 23/0229 |
| 2020/0133955 A1* | 4/2020 | Padmanabhan | ..... | G06F 16/2379 |
| 2020/0160289 A1* | 5/2020 | Mahajan | ............... | H04L 63/123 |

(Continued)

FOREIGN PATENT DOCUMENTS

CN 112602076 A * 4/2021 ........... G06F 16/215

*Primary Examiner* — Neveen Abel Jalil
*Assistant Examiner* — Hubert Cheung
(74) *Attorney, Agent, or Firm* — Van Pelt, Yi & James LLP (57) ABSTRACT

Various embodiments of a system and method for capturing changes in trade information that impact trade authorization and for updating a chain state on a distributed chain database that is used to authorize trades are disclosed herein. In some embodiments, the system comprises: a trade controller configured to obtain a current state from a local database; a rules engine configured to be invoked by the trade controller to apply a ruleset to data extracted from the local database to generate an updated state; an operation auto detector configured to generate a plan to update a chain state on the distributed chain database based at least in part on the updated state; and an execution engine configured to execute the plan and to generate an updated chain state that is used to authorize trades.

12 Claims, 7 Drawing Sheets

(56) References Cited

U.S. PATENT DOCUMENTS

| | | | |
|---|---|---|---|
| 2020/0184556 A1* | 6/2020 | Cella | G06Q 10/0639 |
| 2020/0234293 A1* | 7/2020 | Lee | G06Q 20/38215 |
| 2020/0250177 A1* | 8/2020 | Padmanabhan | G06F 16/27 |
| 2020/0252205 A1* | 8/2020 | Padmanabhan | H04L 9/0643 |
| 2020/0389492 A1* | 12/2020 | Zheng | H04L 9/3213 |
| 2021/0004297 A1* | 1/2021 | Scrivner | G06F 16/2379 |

* cited by examiner

SYNCHRONIZING A CENTRALIZED STATE ON A DISTRIBUTED CHAIN DATABASE WITH AN OFF-CHAIN STATE TO IMPROVE TRADE AUTHORIZATION PRACTICES

BACKGROUND OF THE INVENTION

Token systems to facilitate trades and transfers using smart contracts have been implemented on blockchains, including systems that securely process and transfer a token in a distributed chain database, such as the Ethereum blockchain using an ERC-20 standard protocol. In some embodiments, in order to secure the execution of a transfer, a regulator service is executed on a distributed chain database. The regulator service includes a chain state and returns a value that indicates whether the transfer can proceed. The regulator service determines whether the transfer is authorized, and the token system determines whether to validate or invalidate the transfer in response to the returned value. A transfer includes moving balances from one account to another such as a trade on an exchange or a transfer between participants.

The chain state of the regulator service is controlled by a process that is executed off a distributed chain database. The chain state is defined by a set of parameters that, taken together, specify what actions or trades are allowable. The set of parameters in a chain state can include, for example, participant balances, address mappings, permissions for a participant, and token settings. This chain state is used by the regulator service to determine whether a transfer is authorized.

The chain state as described above is stored or resides on, and can be accessed from, a distributed chain database such as a blockchain (e.g., Ethereum). But information that can impact a participant's ability to trade, including for example information related to a particular participant or token (e.g., permissions and token settings for a smart contract) often changes, and these changes directly impact whether a particular transfer is authorized. Existing systems fail to provide a mechanism for capturing these changes and updating the chain state used by the regulator service to determine whether a transfer is authorized. Accordingly, a mechanism is needed to capture changes in information that impact trade authorization and to update the chain state on a distributed chain database to ensure that the regulator service is authorizing trades based on the most current information.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below, along with accompanying figures that illustrate the principles of the invention. The invention is described in connection with such embodiments, but the invention is not limited to any embodiment. The scope of the invention is limited only by the claims, and the invention encompasses numerous alternatives, modifications and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Various embodiments of a technique to capture changes in information that impact trade authorization and updating a chain state on a distributed chain database that is used to authorize trades are described herein. In some embodiments, the technique includes a system for capturing changes in information that impact trade authorization and for updating a chain state on a distributed chain database that is used to authorize trades, the system comprising: a trade controller configured to obtain a current state from a local database; a rules engine that can be invoked by the trade controller to apply a ruleset to data extracted from the local database to generate an updated state; an operation auto detector configured to generate a plan to update a chain state on a distributed chain database based at least in part on the updated state; and an execution engine configured to execute the plan and to generate an updated chain state that is used to authorize trades. In some embodiments, the operation auto detector is configured to determine a difference between the current state and the updated state and to generate the plan to update the chain state based at least in part on the difference. In some embodiments, the plan comprises one or more operations for updating the chain state. In some embodiments, the operation auto detector is further configured to coalesce one or more operations to provide a minimum set of operations for updating the chain state, wherein the plan consists of the minimum set of operations. In some embodiments, the local database is not on a distributed chain database, and its current state is an approximation of the chain state.

In some embodiments, instead of obtaining a current state from a local database, the trade controller obtains a current state directly from a distributed chain database. In these embodiments, the current state obtained is the chain state currently existing on a distributed chain database at the time the trade controller looks up the data on the distributed chain database.

In some embodiments, the system comprises a sync notification generator configured to generate a notification in response to a possible change in participant information and a notification handler configured to send the notification to the trade controller. The trade controller is further configured to receive the notification and invoke the rules engine in response to the notification.

In some embodiments, instead of having a sync notification generator, the trade controller provides a simple application programming interface (API) for other services to send notifications to the controller. For example, an API can be used to save a notification informing that a participant's information has potentially changed, thereby triggering a need for an update of the chain state on the distributed chain database to ensure that the regulator service is authorizing trades based on the most current information. The notification saved by the API can then be used to invoke the trade controller.

In some embodiments, the system comprises a database state loader configured to retrieve the current state from the local database and to provide the current state to the trade controller. In at least one example, the database state loader is further configured to receive a sync context, wherein the current state is retrieved based at least in part on the sync context. The rules engine is then configured to receive the sync context and to apply a ruleset to generate the updated state based at least in part on the sync context. In some embodiments, the sync context is configured to set a sync scope based at least in part on a selection of one or more subsets of data based on the local state.

In some embodiments, the technique includes a method of capturing changes in information that impact trade authorization and updating a chain state on a distributed chain database that is used to authorize trades, the method comprising: obtaining a current state from a local database; applying a ruleset to data extracted from the local database to generate an updated state; generating a plan to update a chain state on a distributed chain database based at least in part on the updated state; and executing the plan to generate an updated chain state that is used to authorize trades. In some embodiments, the method further comprises determining a difference between the current state and the updated state and generating the plan to update the chain state based at least in part on the difference. In some embodiments, the plan comprises one or more operations for updating the chain state. In some embodiments, the method further comprises coalescing one or more operations to provide a minimum set of operations for updating the chain state, wherein the plan consists of the minimum set of operations. In some embodiments, the local database is not on the distributed chain database, and its current state is an approximation of the chain state.

In some embodiments, the method comprises sending, creating, or generating a notification in response to a change in information relating to current state information in the current state and applying the ruleset to data extracted from the local database to generate an updated state based at least in part on the notification. In some embodiments, notification generation is performed by a sync notification generator as described above. In other embodiments, other services will send, create, or generate notifications internally using an API, and the notification handler will look for unprocessed notifications to run in the system. In some embodiments, the method further comprises obtaining the current state from the local database in response to a notification.

In some embodiments, the method comprises: receiving a sync context; obtaining the current state based at least in part on the sync context; and applying the ruleset to generate the updated state based at least in part on the sync context. In some embodiments, the sync context is configured to set a sync scope based at least in part on a selection of one or more subsets of data based on the local state. As one example, the sync context is configured to set a sync scope based at least in part on a selection of one or more offerings or participants and the current state and the updated state are each defined at least in part by the sync scope.

While the examples provided herein describe a token system implemented on the Ethereum blockchain using the ERC-20 standard protocol (see, e.g., U.S. patent application Ser. No. 15/812,919 entitled Secure Processing and Transfer of Tokens in a Distributed Chain Database filed Nov. 14, 2017, which is incorporated herein by reference for all purposes), the invention is not limited to implementations on Ethereum or to any particular protocol, but may be applied to any decentralized application blockchain platform.

Figure 1:
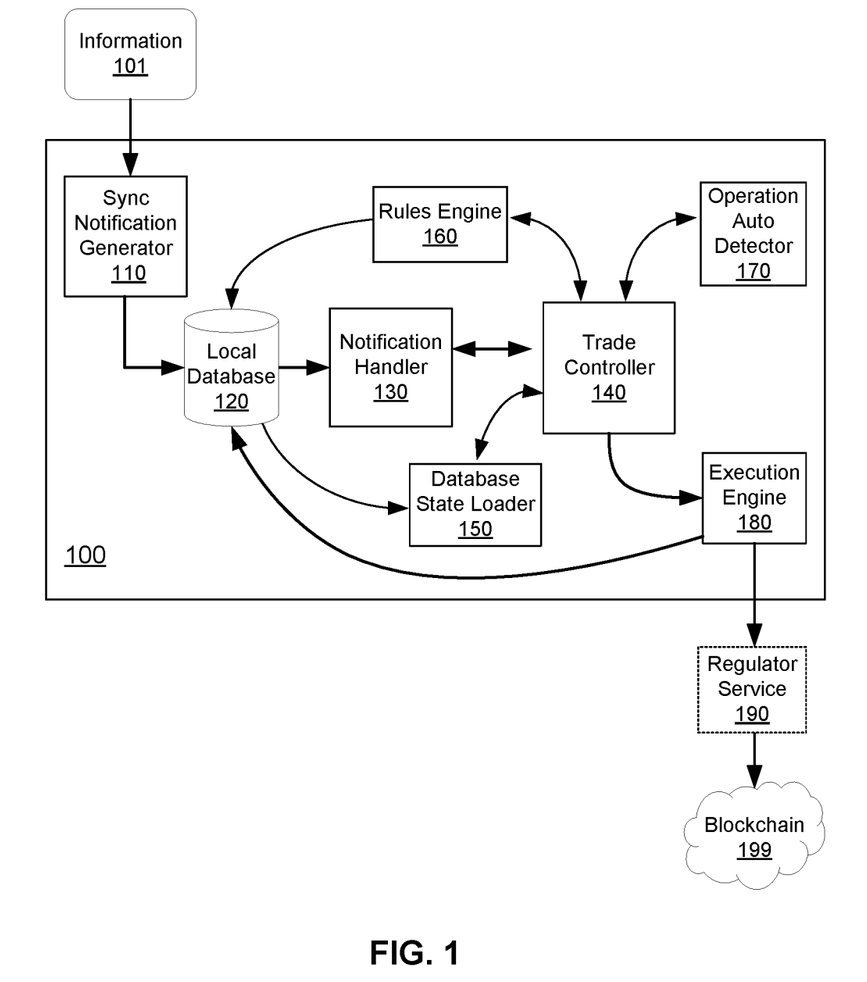
FIG. 1 is a block diagram depicting an exemplary embodiment of a system for capturing changes in information that impact trade authorization and for updating a chain state on a distributed chain database that is used to authorize trades.

FIG. 1 is a block diagram depicting an exemplary embodiment of a system 100 for capturing changes in information that impact trade authorization and for updating a chain state on a distributed chain database that is used to authorize trades. Additionally, as described in further detail below, the system 100 can be used to synchronize a state on a distributed chain database with a local state that is not on the distributed chain database. In this case, a state is defined by a set of parameters that, taken together, specify what actions or trades are allowable. A chain state stored on a distributed chain database (e.g., a blockchain such as Ethereum) can encompass various parameters such as participant balances, address mappings, permissions for a participant, and token settings. This chain state is used by the regulator service to determine whether a transfer is authorized. Examples of a chain state are shown in and described with respect to FIGS. 2 and 3 below.

Figure 2:
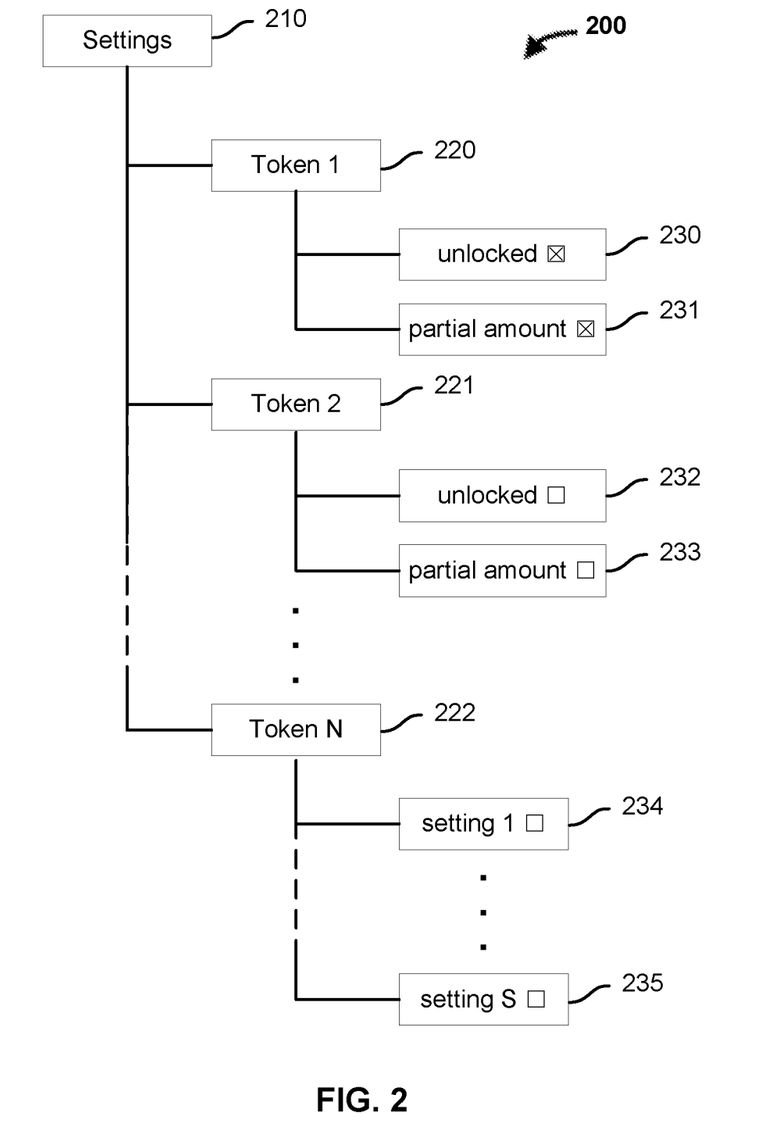
FIG. 2 depicts a data structure for an exemplary embodiment of a chain state in the regulator service, including settings for each token on a per token basis.

FIG. 2 depicts a data structure 200 for an exemplary embodiment of a chain state in the regulator service (e.g., Regulator Service 190 of FIG. 1). As shown in FIG. 2, the chain state can include a number of parameters, including settings 210, for each token on a per token basis. The chain state, for example, can include a setting to authorize or deny authorization for a fractional trade and a setting to lock (i.e. prohibited from being transferred) or unlock all trades.

Token 1 at 220 can be set as unlocked as indicated by the checked box at 230, with fractional trading allowed as indicated by the checked box at 231, while Token 2 at 221 can have its own settings that differ from Token 1. For example, Token 2 can be set as locked as indicated by the unchecked box at 232 with fractional trading prohibited as indicated by the unchecked box at 233. This mechanism can be used to designate settings for any number of tokens up to, for instance, Token N at 222 on a per token basis. In this example, the permissions to unlock and allow partial trading are indicated by checked boxes. Alternatively, parameters can be set to or can return Boolean values or codes. In addition, any number of settings, for example, setting 1 at 234 through setting S at 235, may be included depending on the application.

Figure 3:
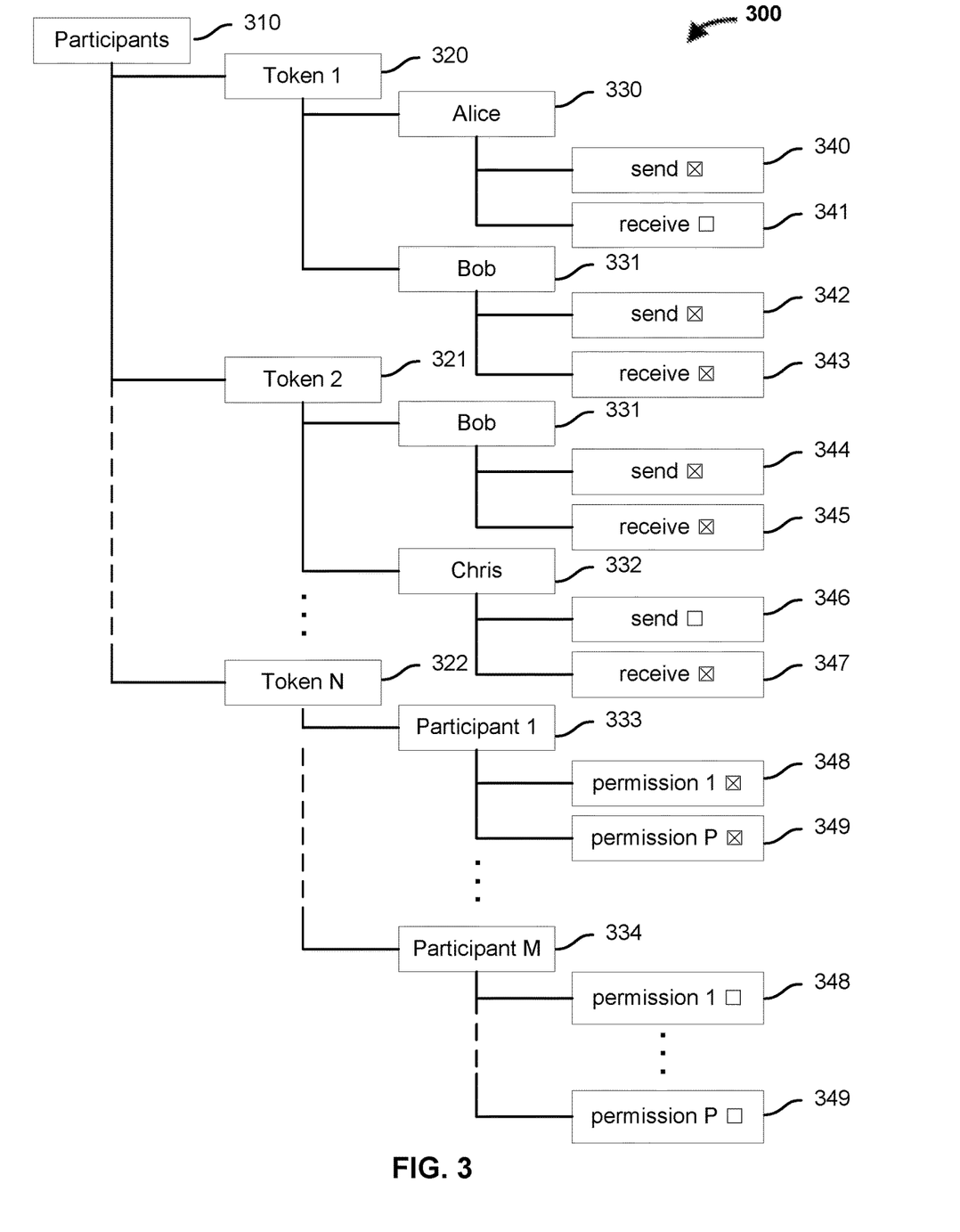
FIG. 3 depicts a data structure for an exemplary embodiment of a chain state in the regulator service, including permissions applied to a participant of a trade.

FIG. 3 depicts a data structure 300 for an exemplary embodiment of a chain state in the regulator service (e.g., Regulator Service 190 of FIG. 1). The chain state can include various parameters, including a setting or a permission that is controlled on a per token basis and that can be applied to a participant of a trade. In addition, changing the chain state by changing the setting or the permission changes the behavior of the regulator service.

For example, as shown in FIG. 3, each token can have set permissions for each participant's ability to send or receive tokens. Token 1 at 320 can be configured for participant Alice 330 to send at 340, as indicated by the checked box, but not receive, as indicated by the unchecked box at 341. Participant Bob 331 can be configured to both send and receive, as indicated by the checked boxes at 342 and 343 respectively. Token 2 at 321 may have participants Bob 331, whose permissions are configured to both send and receive, as indicated by the checked boxes at 344 and 345 respectively, and Chris 332, whose permissions are configured to to receive, as indicated by the checked box at 347, but not to send, as indicated by the unchecked box at 346. This mechanism can be used to set various different permissions, for example, from permission 1 at 348 through permission P at 349, for any number of tokens up to Token N at 322, and for a given set of participants 310, including, for example, Participant 1 at 333 through Participant M at 334, on a per token and per participant basis. In this example, the permissions to send and receive are indicated by checked boxes. Alternatively, the send and receive parameters can be set to or can return Boolean value, or can use a flag, code, or other indicator. In addition, any number of permissions 1-P may be included depending on the application.

The data structures depicted in FIGS. 2 and 3 can reflect the chain state in the regulator service, and the chain state has permissions and settings that may be set for trading on a per token basis. The data structures provide control of the settings and permissions and offer granular control over trading on a per token, per participant level. This feature is useful for various situations that require different permissions for certain participants for any given token. For example, in the case of a change of status for one particular inventor, an accredited investor may buy a token at an initial offering when a token is first offered and have both send and receive permissions for that token. If the investor subsequently loses his or her accreditation status, he or she would still be allowed to hold and transfer the token to another account but may no longer be allowed to receive tokens. In this case, the investor's permissions can be changed to reflect the loss of accreditation status to include only send permissions but not receive permissions.

Another example includes managing different permissions for different participants for a token. In this case, for a private real-estate investment trust (REIT), there is different treatment between foreign and domestic investors with respect to maintaining favorable tax treatment for the purposes of what is called the "domestically controlled rule." To satisfy the rule, the system must ensure that no more than 49% of the shares are held by foreign investors which therefore restricts the amount of tokens the foreign investors are able to purchase. For domestic investors, there is no such limit on ownership (except for concentration limitations, which is a separate rule).

Returning to FIG. 1, a current state is a copy of the chain state saved on a local database (e.g., Local Database 120). Thus, the current state on Local Database 120 is an estimate or approximation of a chain state of a smart contract on a distributed chain database (e.g., Blockchain 199). The regulator service (e.g., Regulator Service 190) uses the chain state to determine whether a transfer is authorized. Moreover, as shown in FIG. 1, Local Database 120 in system 100 is not on a distributed chain database (e.g., Blockchain 199).

In some embodiments, for example, when information related to a particular participant or token (e.g., permissions and token settings for a smart contract) changes, the system 100 is configured to detect the change and generate a notification via a notification generator (e.g., Sync Notification Generator 110). Here, Sync Notification Generator 110 is configured to generate a notification in response to a change in information relating to current state information in the current state. In the example shown, a participant's information changes at 101 and the change is detected by Sync Notification Generator 110, which generates a notification in response to the change in the participant's information. Sync Notification Generator 110 is also configured to save the notification to Local Database 120. Here, Local Database 120 includes information related, for example, to participants and offerings. Here, an offering means a private placement (or unregistered offering) under the Securities Act of 1933, as amended.

Alternatively, in some embodiments, a service (not shown) that modifies participant information sends notifications to a trade controller, (e.g., Trade Controller 140). In response to detecting or receiving the notification from the service, the Sync Notification Generator 110 saves an event that triggers Trade Controller 140 to determine whether any information needs to be changed or updated.

In some embodiments, a scheduled job is configured to run and to handle notifications generated by Sync Notification Generator 110 and saved to Local Database 120. In this case, a notification handler (e.g., Notification Handler 130) is configured to obtain the notification from Local Database 120 and send the notification to a trade controller (e.g., Trade Controller 140). Trade Controller 140 is configured to receive the notification and invoke a rules engine (e.g., Rules Engine 160) in response to the notification. In some embodiments, a notification is triggered internally for the Notification Handler 130 to look for or to detect at a later time. A notification in this case includes, for example, a participant ID, a notification type (e.g., participant change), an offering ID, and a regulator service identifier.

As described above, the system 100 includes Notification Handler 130 configured to provide a mechanism for notifying Trade Controller 140 as to a possible change, for example, to information related to a particular participant. In that case, the change is detected, as shown at 101, and Notification Handler 130 calls Trade Controller 140 and passes a participant identifier associated with the participant whose information has changed. In the case where information associated with a particular offering (e.g., private securities offering) changes, Notification Handler 130 calls Trade Controller 140 and passes an offering identifier associated with the offering whose information has changed (e.g., a change in offering settings such as a maximum number of participants). In that case, the sync context can contain information such as the participant identifier and the offering identifier. This process of notifying or calling Trade Controller 140 upon detecting a change in information can be triggered manually or through scheduled jobs that run periodically, wherein in some embodiments, the Sync Notification Generator monitors information to detect if it has changed in any way.

In some embodiments, Trade Controller 140 is configured to take certain actions in response to the notification, such as, for example, initializing a database state loader (e.g., Database State Loader 150) and a rules engine (e.g., Rules Engine 160). Database State Loader 150 is configured to retrieve a current state from Local Database 120 and to provide the current state to Trade Controller 140. By taking these actions, Trade Controller 140 is able to obtain the current state from Local Database 120.

In some embodiments, Database State Loader 150 is configured to receive a sync context and the current state is retrieved in response to or based at least in part on the sync context. Depending on the sync context, Database State Loader 150 may look at data relevant for example, to a specific offering or participant, or any other relevant data or combinations of data. The sync context is configured to set a sync scope based at least in part on a selection of one or more subsets of data based on the local state. In some embodiments, the sync context provides a mechanism for calling different operational modes for retrieving the current state. In particular, the sync context is configured to set a sync scope based at least in part on a selection, for example, of one or more offering or participants. The sync context can be specified as a value from a set of values, wherein each value defines a different scope.

As one example, the set of values for a sync context includes {resync all, resync participant for an offering, resync offering, resync participant}. In a case where the sync context has the value "resync all," the system will retrieve the current state as it exists in Local Database 120 for all participants across all offerings. In a case where the sync context has the value "resync participant for an offering," the system will retrieve the current state as it exists in Local Database 120 as limited to a specific participant and a specific offering. In a case where the sync context has the value "resync offering," the system 100 will retrieve the current state as it exists in Local Database 120 for all participants for a specific offering. Finally, in the case where the sync context has the value "resync participant," the system will retrieve the current state as it exists in Local Database 120 for a specific participant across all offerings. Note that when the current permissions for a participant are not set up yet, the current state is the empty set.

Additionally, as shown in FIG. 1, the system 100 includes a rules engine (e.g., Rules Engine 160) configured to be invoked by Trade Controller 140 to apply a ruleset to data extracted from Local Database 120 to generate an updated state. When invoked, Rules Engine 160 uses the information from a notification to look up all the other state variables it needs to determine the next version of the state (e.g., the updated state) and to return this updated state to Trade Controller 140. In some embodiments, Rules Engine 160 is also configured to receive the sync context and to apply the ruleset to generate the updated state based at least in part on the sync context.

The sync context provides a mechanism for Rules Engine 160 to run different modes of execution including, for example, running a ruleset against every offering and every participant, or running a ruleset against a specific offering for a specific participant.

In the example described above for retrieving the current state from Local Database 120, the sync context includes {resync all, resync participant for an offering, resync offering, resync participant}. In the case where the sync context has the value "resync all," Rules Engine 160 will apply a ruleset for all participants across all offerings to generate an updated state. In the case where the sync context has the value "resync participant for an offering," Rules Engine 160 will apply a ruleset to a specific participant and a specific offering to generate an updated state. In the case where the sync context has the value "resync offering," Rules Engine 160 will apply a ruleset for all participants for a specific offering to generate an updated state. Finally, in the case where the sync context has the value "resync participant," Rules Engine 160 will apply a ruleset for a specific participant across all offerings to generate an updated state.

In some embodiments, different regulator services enforce different rule sets for different types of asset classes. For example, a real-estate investment trust (REIT) has certain requirements including ownership caps (e.g., setting minimum and maximum shareholder limits) and a need to distinguish between foreign and domestic participants—these would be specific to the regulator service editor for this asset class. In some embodiments, applying a rule set to a specific participant across different offerings looks at a number of different pieces of participant information and returns a result including a set of permissions for the participant, wherein if any one of the permissions in the set has a "no permission" value, the "no permission" value overrides all of the permissions in the set. Application of the rule in this particular case results in not permitting the specific participant in this example to trade, which is reflected in parameters of the new or updated state generated by Rules Engine 160.

Once the Rules Engine 160 has generated the updated state, it provides the updated state to Trade Controller 140, which also has the current state from Local Database 120 received from Database State Loader 150. Note that, in some embodiments, the same sync context is used by Database State Loader 150 to retrieve the current state from Local Database 120 and by Rules Engine 160 to apply a ruleset as described above. In these embodiments, the current state is retrieved and the updated state is generated using the same scope with respect to, for example, offerings and participants.

Trade Controller 140 passes both the current state and the updated state to an operation auto detector (e.g., Operation Auto Detector 170) configured to generate a plan to update a chain state on a distributed chain database based at least in part on the updated state. In some embodiments and as will be described in more detail below, the operation auto detector is configured to determine a difference between the current state and the updated state and to generate the plan to update the chain state based at least in part on the difference. For example, a difference is determined by comparing two states, in this case, the current state and the updated state, and identifying parameters that do not match up between the two states. This difference is then used to determine what parameters need to be changed in the chain state and what actions or operations need to be taken to synchronize the chain state to the updated state.

In some embodiments, the plan includes zero or more operations for updating the chain state on the distributed chain database. In these embodiments, the operations provide a set of executable actions to get from a first state (e.g., the current state) to a second state (e.g., the updated state). As an example, an individual operation is used to change participant information. For instance, if a ruleset requires a participant to be accredited to trade, and the participant is not accredited anymore, an operation is used to change the participant's permissions to "no send" or "no receive." Using an operation abstracts away how to perform an action—in other words, an operation provides a direction or instruction to execute a result for a change of state without specifying how to perform the action. In this manner, the same operation can be applied to a certain contract located at an address on one blockchain such as Ethereum, but can also be applied to another contract on a different blockchain.

As an example, operations are used to apply permissions for certain participants for certain offerings. These operations can be extensible to different applications and different regulator services to add more functionality. For example, with respect to participant permissions, operations exist for changing participant permissions, adding participant permissions, and removing participant permissions. As another example, with respect to offerings, operations exist for setting a maximum or minimum number of participants for a given offering, and setting a limitation on the number of tokens owned by foreign participants.

In some embodiments, Operation Auto Detector 170 is further configured to coalesce one or more operations (e.g., in an initial plan) to provide a minimum set of operations (e.g., a final or optimized plan) for updating the chain state, wherein the plan consists of the minimum set of operations to update the chain state. Note that, as will be described in more detail below, coalescing one or more operations to produce a minimum set can result in a set having no operations (e.g., where certain operations have the effect of cancelling each other out).

In this case, an initial plan or set of operations generated by Operation Auto Detector 170 is coalesced to create an optimized plan required for updating the chain state (e.g., the state used by Regulator Service 190 to determine whether a trade or transaction is authorized) by synchronizing the chain state on a distributed chain database (e.g., Blockchain 199) with the updated state from Trade Controller 140. For example, one mechanism for coalescing includes detecting and removing duplicates from the initial plan generated by Operation Auto Detector 170 to produce an optimized plan. As another example, if the initial plan includes a set of operations to: change a permission from false to true, to change the permission from true to false, and then to change the permission from false to true, coalescing this set of operations in the initial plan produces an optimized plan having zero operations—effectively leaving the permission at true, since that is the minimum set of operations that implements the desired result.

As mentioned above, an operation abstracts away how to perform an action by specifying the action without requiring a particular method or function to execute the action to produce a desired result. In some embodiments, in order to execute the action, an operation includes specific methods or functions that can be called by Trade Controller 140 to produce a desired result, such as updating the chain state on a distributed chain database.

In particular, as shown in FIG. 1, the system 100 includes an execution engine (e.g., Execution Engine 180), which is configured to execute the plan. As described above, the plan includes a list or set of operations, and each operation in turn includes methods or functions that, when executed, produce the desired result.

In some embodiments, each operation implements methods or functions that act on or produce results on the distributed chain database (e.g., Blockchain 199), the local database (e.g., Local Database 120) or on an internal state of the system (e.g., system 100). For example, a method "chain_forward" is used to perform an operation (e.g., via a regulator service call to a regulator service editor by calling a function on a smart contract on-chain or doing a method call to the smart contract) on a distributed chain database such as Ethereum to update a chain state. In this case, a regulator service editor is a wrapper around a smart contract on the distributed chain database that is used call the regulator service. In contrast, a method "database_forward" operates on a local database to update a current state stored in the local database to a new state (e.g., the updated state generated by Rules Engine 160). This provides a mechanism for updating the local database when participant information changes. Finally, a method "state_forward" is configured to update an internal or intermediate state used by the system to be the same as the local state (e.g., the updated current state stored in the local database as a result of applying the "database_forward" method).

In some embodiments, the system runs operations on a distributed chain database first, followed by operations on the local database, and then operations to the internal state. In the example described above, chain_forward is applied first, followed by database_forward, and then state_forward. In these embodiments, chain_forward is applied first due to a higher rate of failure when executing methods on the distributed chain database. In particular, failures can occur when sending transactions to the distributed chain database to set a permission for a participant. This is a long running process, so the call is assumed to be valid as soon as it is sent. However, as a result of idempotency of operations, the call can be sent repeatedly if it happens to fail. Thus, if the database_forward methods are applied first to change or update the current state in the local database, and a subsequent chain_forward fails to change or update the chain state on the distributed chain database, a potential discrepancy will exist between the chain state on the distributed chain database and the current state (which is the approximation or estimate of the chain state) now on the local database as a result of applying the database_forward method. Accordingly, applying or running operations on the chain first, followed by operations on the local database, and then operations on the internal state can avoid potential discrepancies between what is on the distributed chain database and what is on the local database. The chain_forward, database_forward, or state_forward methods or functions along with other methods and functions can be used as needed, allowing the system to apply each operation as described above without knowledge of its specific implementations.

In some embodiments, Execution Engine 180 is configured to perform or execute the plan by executing or running all of the operations in the plan. When the Execution Engine 180 executes these operations, it is interacting with a smart contract to set the chain state used by Regulator Service 190 on Blockchain 199.

As an example, in the case of a private securities offering for a specific participant, the current state includes a parameter for a permission of a participant to be able to send/receive tokens. Suppose that as shown in FIG. 1, the information for a particular participant, Alice, has changed at 101 from the current state on the local database (e.g., Local Database 120). Recall that the current state on the local database is an estimate of the chain state, which a regulator service (e.g., Regulator Service 190) uses to determine whether Alice can send or receive tokens for that offering. In this case, the current state shows that Alice has permission to send/receive tokens for that offering. However, Alice's information has changed such that she no longer has permission to send/receive tokens for that offering—this change in Alice's information is shown at 101 and is detected by Sync Notification Generator 110.

Sync Notification Generator 110 generates a notification in response to the change detected in Alice's information and saves the notification and the changed information to Local Database 120. Notification Handler 130 obtains the notification from Local Database 120 through a scheduled job and provides the notification to Trade Controller 140. Trade Controller 140 receives the notification from Notification Handler 130 and invokes Rules Engine 160 in response to the notification. The notification includes a participant identifier identifying Alice, a notification type indicating a change in participant permissions, an offering identifier for that offering, and a regulator service identifier for the regulator service applicable to that offering.

Trade Controller 140 takes certain actions in response to the notification, initializing a Database State Loader 150 and Rules Engine 160. Database State Loader 150 retrieves a current state from Local Database 120 provides the current state to Trade Controller 140.

To retrieve the current state in this example, Database State Loader 150 receives a sync context and the current state is retrieved in response to or based at least in part on the sync context. In this case, the sync context is set to "resync participant for an offering," which limits the scope such that the system retrieves the current state as it exists in the Local Database 120 limited to Alice and that particular offering.

To generate an updated state, Trade Controller 140 invokes Rules Engine 160, which uses the information from the notification to look up all the other state variables it needs to determine the next version of the state (e.g., the updated state) and to return this updated state to Trade Controller 140. In this example, Rules Engine 160 receives the sync context "resync participant for an offering" used by Database State Loader 150 to retrieve the current state and applies a ruleset to generate the updated state based at least in part on the sync context. In this case, Rules Engine 160 applies a ruleset to Alice and that particular offering to generate an updated state.

Once the Rules Engine 160 has generated the updated state, it provides the updated state to Trade Controller 140, which also has the current state from Local Database 120 received from Database State Loader 150. Trade Controller 140 passes both the current state and the updated state to Operation Auto Detector 170, which generates a plan to update a chain state on a distributed chain database based at least in part on the updated state. In this example, Operation Auto Detector 170 determines a difference between the current state and the updated state and generates the plan to update the chain state based at least in part on the difference. Here, a difference is determined by comparing the current state where Alice has send and receive permissions and the updated state, where Alice has no send or receive permissions and identifying values for parameters that do not match up between the two states. In this case, the send and receive permissions for that particular offering for Alice do not match up, and this difference is used to inform the actions or operations that need to be taken to synchronize the chain state to the updated state determined by Rules Engine 160.

In this example, the plan generated by Operation Auto Detector 170 includes operations for updating the chain state on the distributed chain database to show that Alice no longer has send or receive permissions for that particular offering. Thus, an operation for removing participant permission is used to set Alice's permissions to "no send" or "no receive." Execution Engine 180 executes the plan by running the operations in the plan, wherein each operation includes methods or functions that when executed, produce the desired result.

In this example, running the operation to remove participant permission for Alice's permissions for the offering results in executing a "chain_forward" method (e.g., via a regulator service call to a regulator service editor) on a distributed chain database to update a chain state and a method "database_forward" to update the current state stored in the local database to a new state (e.g., the updated state generated by Rules Engine 160). In this manner, the chain state is updated on the distributed chain database to reflect that Alice no longer has permissions to send or receive for the offering. The current state is also updated on Local Database 120 to reflect that Alice no longer has permissions to send or receive for that particular offering. Additionally, a method "state_forward" updates an internal or intermediate state used by the system to be the same as the local state (e.g., the updated current state stored in the local database as a result of applying the "database_forward" method).

An embodiment of a system for capturing changes in information that impact trade authorization and for updating a chain state on a distributed chain database that is used to authorize trades, and an example of using the system has been described above with respect to FIG. 1. Various embodiments of a method that can be performed by the system of FIG. 1 will now be described with respect to the following figures.

Figure 4A:
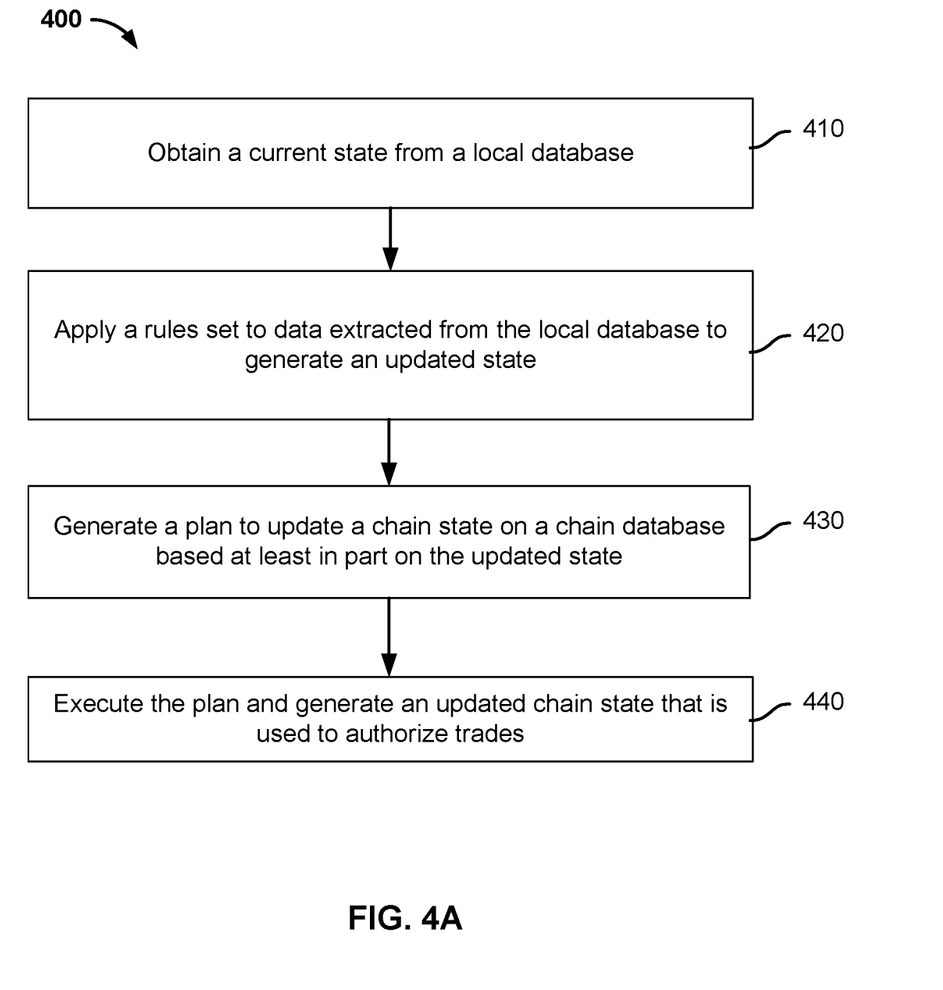
FIG. 4A is a flowchart illustrating an embodiment of a method of capturing changes in information that impact trade authorization and updating a chain state on a distributed chain database that is used to authorize trades.

FIG. 4A is a flowchart illustrating an embodiment of a method capturing changes in information that impact trade authorization and updating a chain state on a distributed chain database that is used to authorize trades. As described with respect to the disclosed system, the method can also be used to synchronize a state on a distributed chain database with a local state that is not on the distributed chain database. In the example shown, the steps in method 400 of FIG. 4A are performed by components of system 100.

As shown in FIG. 4A, the method 400 includes obtaining a current state from a local database at 410. For example, in system 100, Trade Controller 140 obtains a current state from Local Database 120. In some embodiments, Database State Loader 150 retrieves the current state from Local Database 120 and provides the current state to Trade Controller 140.

At 420, the method 400 includes applying a ruleset to data extracted from the local database to generate an updated state. For instance, in system 100, Trade Controller 140 invokes a rules engine (e.g., Rules Engine 160) to apply a ruleset to data extracted from Local Database 120 to generate an updated state.

At 430, the method 400 includes generating a plan to update a chain state on a distributed chain database based at least in part on the updated state. In system 100, Trade Controller 140 passes both the current state obtained from Local Database 120 and the updated state generated by Rules Engine 160 to an operation auto detector (e.g., Operation Auto Detector 170). Operation Auto Detector 170 generates a plan to update a chain state on a distributed chain database based at least in part on the updated state.

Finally, at 440 the method includes executing the plan and generating an updated chain state that is used to authorize trades, which is performed by Execution Engine 180 in system 100.

Figure 4B:
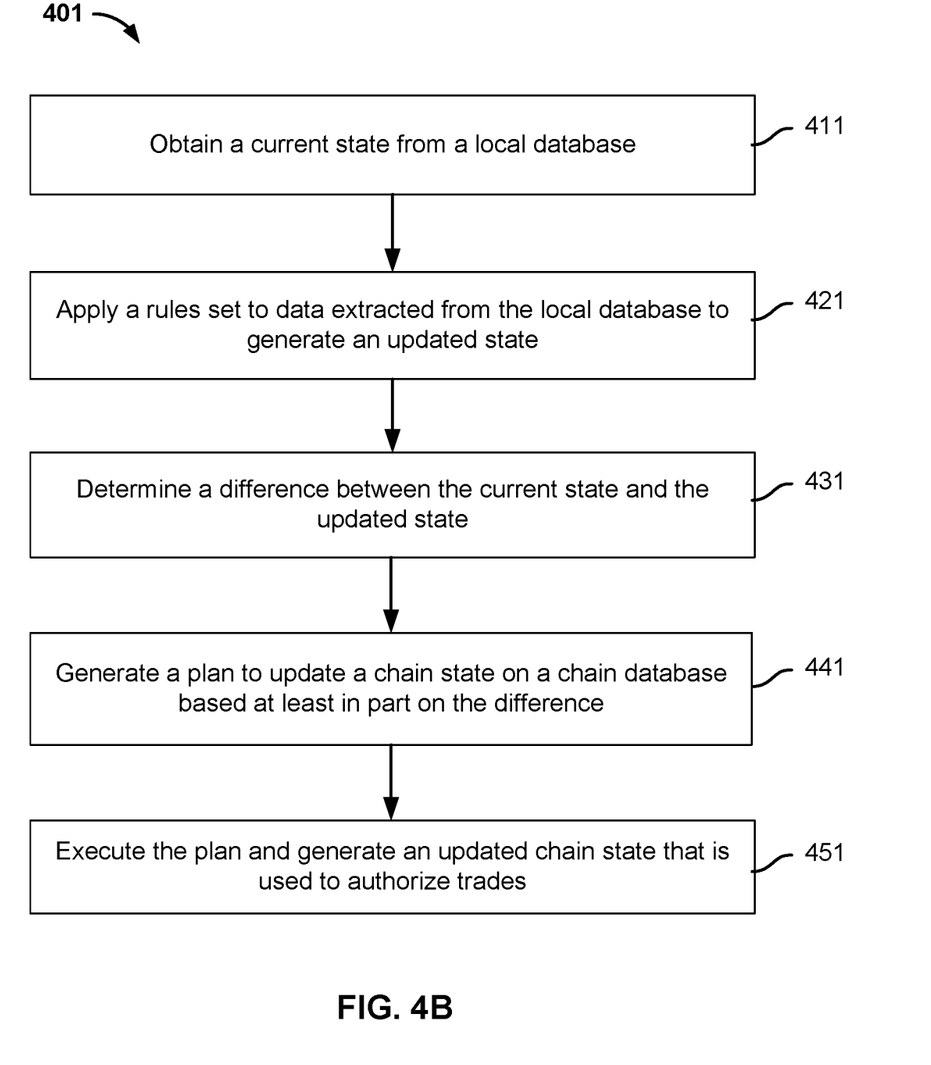
FIG. 4B is a flowchart illustrating an embodiment of a method of capturing changes in information that impact trade authorization and updating a chain state on a distributed chain database that is used to authorize trades including by determining a difference between a current state and an updated state.

FIG. 4B is a flowchart illustrating an embodiment of a method capturing changes in information that impact trade authorization and updating a chain state on a distributed chain database that is used to authorize trades, including by determining a difference between a current state and an updated state. As in the previous method 400 described above, the method 401 of FIG. 4B comprises: obtaining a current state from a local database at 411 and applying a ruleset to data extracted from the local database to generate an updated state at 421. In this case, the method 401 also includes determining a difference between a current state and an updated state at 431 and generating a plan to update a chain state on a distributed chain database based at least in part on the difference at 441. Finally, the plan is executed and an updated chain state that is used to authorize trades is generated at step 451.

In some embodiments, the method 401 shown in FIG. 4B is performed by a system such as the exemplary system 100 of FIG. 1, wherein each step is performed by a component of the system. In this case, Trade Controller 140 obtains a current state from Local Database 120 (step 411) and in some embodiments, Database State Loader 150 retrieves the current state from Local Database 120 and provides the current state to Trade Controller 140. Trade Controller 140 invokes a rules engine (e.g., Rules Engine 160) to apply a ruleset to data extracted from Local Database 120 to generate an updated state (step 421). Trade Controller 140 passes both the current state obtained from Local Database 120 and the updated state generated by Rules Engine 160 to an operation auto detector (e.g., Operation Auto Detector 170). In this case, Operation Auto Detector 170 determines a difference between the current state and the updated state (step 431) and generates a plan to update the chain state based at least in part on the difference (step 441). A difference is determined by comparing two states, in this case, the current state and the updated state, and identifying parameters that do not match up between the two states. This difference is then used to determine what parameters need to be changed in the chain state and what actions or operations need to be taken to synchronize the chain state to the updated state determined by Rules Engine 160. Finally, Execution Engine 180 executes the plan and generates an updated chain state (step 451).

Figure 4C:
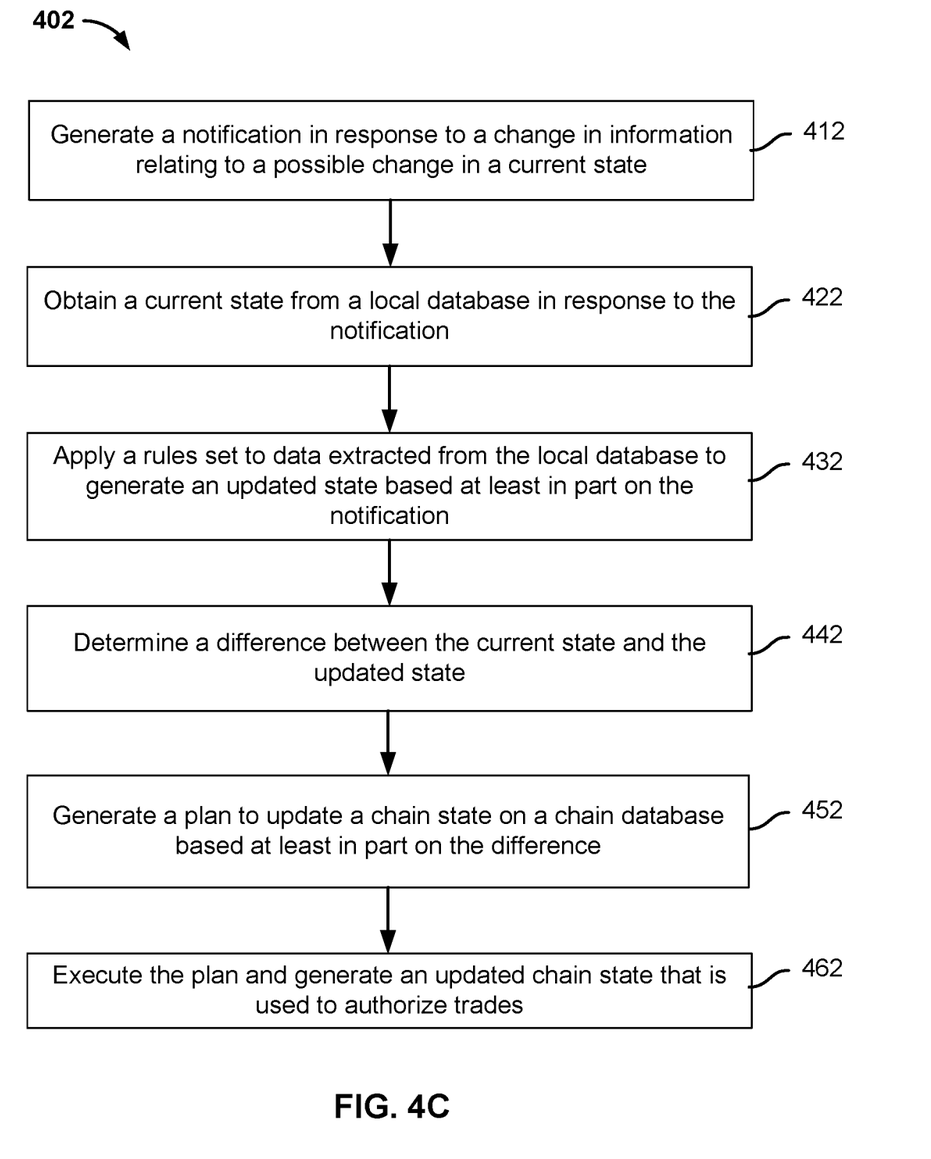
FIG. 4C is a flowchart illustrating an embodiment of a method of capturing changes in information that impact trade authorization and updating a chain state on a distributed chain database that is used to authorize trades including by generating a notification in response to a change in information relating to current state information in the current state.

FIG. 4C is a flowchart illustrating an embodiment of a method capturing changes in information that impact trade authorization and updating a chain state on a distributed chain database that is used to authorize trades, including by generating a notification in response to a change in information relating to current state information in the current state. As shown in FIG. 4C, the method 402 comprises: generating a notification in response to a change in information relating to current state information in the current state at 412; obtaining a current state from a local database in response to the notification at 422; and applying a ruleset to data extracted from the local database to generate an updated state based at least in part on the notification at 432. In this case, the method 402 also includes determining a difference between the current state and the updated state at 442 and generating a plan to update a chain state on a distributed chain database based at least in part on the difference at 452. Finally, the plan is executed and an updated chain state that is used to authorize trades is generated at step 462.

In some embodiments, the method 402 shown in FIG. 4C is performed by a system such as the exemplary system 100 of FIG. 1, wherein each step is performed by a component of the system. For example, when information related for example to a particular participant or offering (e.g., permissions and token settings for a smart contract) changes, the method 402 detects the change and generates a notification at 412 in response to the detected change in information. As described with respect to FIG. 1, the notification is generated via a notification generator (e.g., Sync Notification Generator 110). In the example shown in FIG. 1, an participant's information changes at 101 and the change is detected by Sync Notification Generator 110, which generates a notification in response to the change in the participant's information (step 412). In some embodiments, the method includes saving the notification and the changed information to a local database. In the example of FIG. 1, Sync Notification Generator 110 saves the notification and the changed information to Local Database 120. The local database includes information related to, for example, participants and offerings.

In some embodiments, a scheduled job is configured to run and to handle notifications generated by Sync Notification Generator 110 and saved to Local Database 120. In this case, a notification handler (e.g., Notification Handler 130) obtains the notification from Local Database 120 and sends the notification to a trade controller (e.g., Trade Controller 140). Trade Controller 140 receives the notification and invokes a rules engine (e.g., Rules Engine 160) in response to the notification. In some embodiments, for example, after a participant provides information to create an account, a notification is triggered internally for the Notification Handler 130 to look for or to detect the information at a later time. A notification in this case includes a participant identifier, a notification type (e.g., participant change), an offering ID, and a regulator service identifier.

As described above, the system 100 includes Notification Handler 130 for notifying Trade Controller 140 as to a possible change in state. In the case where a particular participant's information changes and the change is detected as shown at 101, Notification Handler 130 calls Trade Controller 140 and passes a participant identifier associated with the participant whose information has changed. In the case where information associated with a particular offering changes, Notification Handler 130 calls Trade Controller 140 and passes an offering identifier associated with the offering whose information has changed (e.g., a change in offering settings such as a maximum number of participants). This process of notifying or calling Trade Controller 140 upon detecting a change in information can be triggered manually, or through scheduled jobs that run periodically (e.g., every few minutes), wherein the Sync Notification Generator 110 monitors information to detect if it has changed in any way.

In some embodiments, Trade Controller 140 takes certain actions in response to the notification, such as, for example, initializing a database state loader (e.g., Database State Loader 150) and a rules engine (e.g., Rules Engine 160). Database State Loader 150 retrieves a current state from Local Database 120 and provides the current state to Trade Controller 140. By taking these actions, Trade Controller 140 is able to obtain the current state from Local Database 120 based at least in part on the notification (step 422).

Trade Controller 140 obtains a current state from Local Database 120 and in some embodiments, Database State Loader 150 retrieves the current state from Local Database 120 and provides the current state to Trade Controller 140. At this point, Trade Controller 140 invokes a rules engine (e.g., Rules Engine 160) to apply a ruleset to data extracted from Local Database 120 to generate an updated state based at least in part on the notification (step 432).

In some embodiments, Trade Controller 140 passes both the current state obtained from Local Database 120 and the updated state generated by Rules Engine 160 to an operation auto detector (e.g., Operation Auto Detector 170). Operation Auto Detector 170 determines a difference between the current state and the updated state (step 442) and generates a plan to update the chain state based at least in part on the difference (step 452). A difference is determined by comparing two states, in this case, the current state and the updated state, and identifying parameters that do not match up between the two states. This difference is then used to determine what parameters need to be changed in the chain state and what actions or operations need to be taken to synchronize the chain state to the updated state determined by Rules Engine 160. Finally, Execution Engine 180 executes the plan and generates an updated chain state (step 462).

Figure 4D:
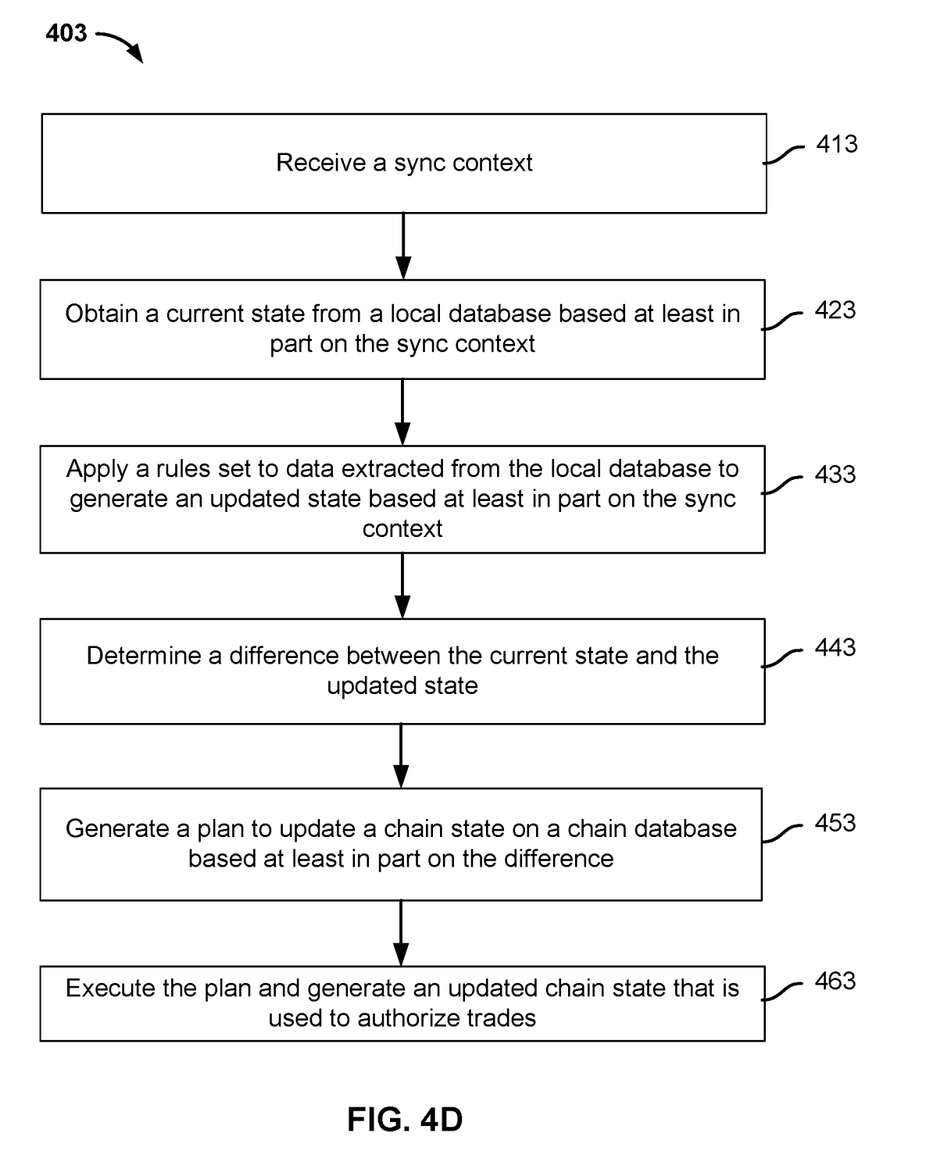
FIG. 4D is a flowchart illustrating an embodiment of a method of capturing changes in information that impact trade authorization and updating a chain state on a distributed chain database that is used to authorize trades including by using a sync context.

FIG. 4D is a flowchart illustrating an embodiment of a method capturing changes in information that impact trade authorization and updating a chain state on a distributed chain database that is used to authorize trades, including by using a sync context. As shown in FIG. 4D, the method 403 comprises: receiving a sync context at 413; obtaining a current state from a local database based at least in part on the sync context at 423; and applying a ruleset to data extracted from the local database to generate an updated state based at least in part on the sync context at 433. In this case, as with previous methods 401 and 402, the method 403 includes determining a difference between the current state and the updated state at 443 and generating a plan to update a chain state on a distributed chain database based at least in part on the difference at 453. Finally, the plan is executed and an updated chain state that is used to authorize trades is generated at step 463.

In some embodiments, the method 403 shown in FIG. 4D is performed by a system such as the exemplary system 100 of FIG. 1, wherein each step is performed by a component of the system. For example, in some embodiments as described above with respect to FIG. 1, Database State Loader 150 receives a sync context (step 413) and a current state is obtained from a local database in response to or based at least in part on the sync context (step 423). Depending on the sync context, Database State Loader 150 may look at data relevant for example, to a specific offering, participant, or any other relevant data or combinations of data. In some embodiments, the sync context provides a mechanism for calling different operational modes for retrieving the current state. In particular, the sync context sets a sync scope based at least in part on a selection of, for example, one or more offerings or participants. The sync context is specified as a value from a set of values, wherein each value defines a different scope. The set of values for a sync context is described in detail above with respect to FIG. 1.

Trade Controller 140 invokes Rules Engine 160, which applies a ruleset to generate an updated state based at least in part on the sync context (step 433). In particular, as described in detail above with respect to FIG. 1, the sync context provides a mechanism for Rules Engine 160 to run different modes of execution including, for example, running a ruleset against every offering and every participant, or running a ruleset against a specific offering for a specific participant.

Once the Rules Engine 160 has generated the updated state, it provides the updated state to Trade Controller 140, which also has the current state from Local Database 120 received from Database State Loader 150. Note that, in some embodiments, the same sync context is used by Database State Loader 150 to retrieve the current state from Local Database 120 and by Rules Engine 160 to apply a ruleset as described above. In these embodiments, the current state is retrieved and the updated state is generated using the same scope with respect to offerings and participants.

Trade Controller 140 passes both the current state obtained from Local Database 120 and the updated state generated by Rules Engine 160 to an operation auto detector (e.g., Operation Auto Detector 170). Operation Auto Detector 170 determines a difference between the current state and the updated state (step 443) and generates a plan to update the chain state based at least in part on the difference (step 453). A difference is determined by comparing two states, in this case, the current state and the updated state, and identifying parameters that do not match up between the two states. This difference is then used to determine what parameters need to be changed in the chain state and what actions or operations need to be taken to synchronize the chain state to the updated state determined by Rules Engine 160. Finally, Execution Engine 180 executes the plan and generates an updated chain state that is used to authorize trades (step 463).

Some method embodiments also include a step of coalescing one or more operations to provide a minimum set of operations for updating the chain state, wherein the plan consists of the minimum set of operations. Coalescing a set of operations, for example, by Operation Auto Detector 170 is described in detail above with respect to FIG. 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for capturing changes in information that impact trade authorization and for updating a chain state on a distributed chain database that is used to authorize trades, the system comprising:
 a processor configured to provide:
  a database state loader configured to:
   receive a sync context, wherein:
    the sync context includes one or more of the following: resync all, resync participant for an offering, resync offering, or resync participant, wherein the resync all relates to applying at least one ruleset for all participants across all offerings to generate an updated state, wherein the resync participant for the offering relates to applying at least one ruleset to a specific participant and a specific offering to generate an updated state, wherein the resync offering relates to applying at least one ruleset for all participants for a specific offering to generate an updated state, and wherein the resync participant relates to applying at least one ruleset for a specific participant across all offerings to generate an updated state;

the sync context provides a mechanism for calling different operational modes for retrieving a current state;

the current state is retrieved based at least in part on the sync context; and a rules engine is configured to receive the sync context and to apply a ruleset to generate the updated state based at least in part on the sync context;

a trade controller configured to obtain the current state from a local database, the current state corresponding to the chain state on the distributed chain database, the current state being selected from a copy of the chain state, an approximation of the chain state, and an estimate of the chain state, the chain state including a plurality of parameters specifying the authorized trades, wherein the plurality of parameters include one or more of the following: participant balances, address mappings, permissions for a participant, or token settings;

the rules engine configured to be invoked by the trade controller to apply the ruleset to data extracted from the local database to generate the updated state, comprising to:

selecting the ruleset based on a first sync context or a second sync context, wherein the first sync context is different from the second sync context;

an operation auto detector configured to generate a plan to update the chain state on the distributed chain database based at least in part on the updated state and the current state, the operation auto detector further being configured to coalesce one or more operations for updating the chain state to provide a minimum set of operations for updating the chain state such that the plan consists of the minimum set of operations, wherein the updated chain state includes a change to one or more parameters of the current state, and wherein the generating of the plan to update the chain state comprises to:

compare the current state and the updated state to determine a difference between the current state and the updated state;

identify parameters that do not match up between the current state and the updated state based on the comparison; and determine the parameters to be changed in the current state and what actions or operations are to be taken to synchronize the chain state to the updated state to obtain the plan; and an execution engine configured to execute the plan and to generate an updated chain state that is used to authorize trades, the updated chain state being generated using the minimum set of operations in the plan; and a memory coupled to the processor and configured to provide the processor with instructions.

2. The system of claim 1, wherein the processor is further configured to provide:

a sync notification generator configured to generate a notification in response to a change in information relating to current state information in the current state; and a notification handler configured to send the notification to the trade controller, wherein the trade controller is further configured to receive the notification and invoke the rules engine in response to the notification.

3. The system of claim 1, wherein the local database is not on the distributed chain database and wherein the current state is the approximation of the chain state.

4. The system of claim 1, wherein the local database is not on the distributed chain database and wherein the current state is the approximation of the chain state.

5. The system of claim 1, wherein:

the sync context is configured to set a sync scope based at least in part on a selection of one or more subsets of data based on the local state; and the current state and the updated state are each defined at least in part by the sync scope.

6. The system of claim 1, wherein the data extracted from the local database includes at least one of a notification generated in response to a change in information related to the current state and saved to the local database, an event related to the current state that is saved to the local database, and at least a portion of the current state.

7. A method of capturing changes in information that impact trade authorization and updating a chain state on a distributed chain database that is used to authorize trades, the method comprising:

receiving a sync context, wherein:

the sync context includes one or more of the following: resync all, resync participant for an offering, resync offering, or resync participant, wherein the resync all relates to applying at least one ruleset for all participants across all offerings to generate an updated state, wherein the resync participant for the offering relates to applying at least one ruleset to a specific participant and a specific offering to generate an updated state, wherein the resync offering relates to applying at least one ruleset for all participants for a specific offering to generate an updated state, and wherein the resync participant relates to applying at least one ruleset for a specific participant across all offerings to generate an updated state;

the sync context provides a mechanism for calling different operational modes for retrieving a current state;

the current state is retrieved based at least in part on the sync context; and a ruleset is applied to generate the updated state based at least in part on the sync context;

obtaining the current state from a local database, the current state corresponding to the chain state on the distributed chain database, the current state being selected from a copy of the chain state, an approximation of the chain state, and an estimate of the chain state, the chain state including a plurality of parameters specifying the authorized trades, wherein the plurality of parameters include one or more of the following: participant balances, address mappings, permissions for a participant, or token settings;

applying the ruleset to data extracted from the local database to generate the updated state, comprising:

selecting the ruleset based on a first sync context or a second sync context, wherein the first sync context is different from the second sync context;

generating a plan to update the chain state on the distributed chain database based at least in part on the updated state and the current state, the operation auto detector further being configured to coalesce one or more operations for updating the chain state to provide a minimum set of operations for updating the chain state such that the plan consists of the minimum set of operations, wherein the updated chain state includes a change to one or more parameters of the current state, and wherein the generating of the plan to update the chain state comprises:
  comparing the current state and the updated state to determine a difference between the current state and the updated state;
  identifying parameters that do not match up between the current state and the updated state based on the comparison; and
  determining the parameters to be changed in the current state and what actions or operations are to be taken to synchronize the chain state to the updated state to obtain the plan; and
executing the plan and generating an updated chain state that is used to authorize trades, the updated chain state being generated using the minimum set of operations.

8. The method of claim 7, further comprising:
generating a notification in response to a change in information relating to current state information in the current state; and
applying the ruleset to the data extracted from the local database to generate the updated state based at least in part on the notification.

9. The method of claim 7, further comprising:
obtaining the current state from the local database in response to a notification, wherein the local database is not on the distributed chain database and wherein the current state is the approximation of the chain state.

10. The method of claim 7,
wherein the sync context is configured to set a sync scope based at least in part on a selection of one or more subsets of data based on the local state and wherein the current state and the updated state are each defined at least in part by the sync scope.

11. A computer program product for synchronizing a state on a distributed chain database with a local state that is not on the distributed chain database, the computer program product being embodied in a tangible computer readable storage medium and comprising computer instructions for:
receiving a sync context, wherein:
  the sync context includes one or more of the following: resync all, resync participant for an offering, resync offering, or resync participant, wherein the resync all relates to applying at least one ruleset for all participants across all offerings to generate an updated state, wherein the resync participant for the offering relates to applying at least one ruleset to a specific participant and a specific offering to generate an updated state, wherein the resync offering relates to applying at least one ruleset for all participants for a specific offering to generate an updated state, and wherein the resync participant relates to applying at least one ruleset for a specific participant across all offerings to generate an updated state;
  the sync context provides a mechanism for calling different operational modes for retrieving a current state;
  the current state is retrieved based at least in part on the sync context; and
  a ruleset is applied to generate the updated state based at least in part on the sync context;
obtaining the current state from a local database, the current state corresponding to the chain state on the distributed chain database, the current state being selected from a copy of the chain state, an approximation of the chain state, and an estimate of the chain state, the chain state including a plurality of parameters specifying the authorized trades, wherein the plurality of parameters include one or more of the following: participant balances, address mappings, permissions for a participant, or token settings;
applying the ruleset to data extracted from the local database to generate the updated state, comprising:
  selecting the ruleset based on a first sync context or a second sync context,
wherein the first sync context is different from the second sync context;
generating a plan to update a chain state on the distributed chain database based at least in part on the updated state and the current state, the operation auto detector further being configured to coalesce one or more operations for updating the chain state to provide a minimum set of operations for updating the chain state such that the plan consists of the minimum set of operations, wherein the updated chain state includes a change to one or more parameters of the current state, and wherein the generating of the plan to update the chain state comprises:
  comparing the current state and the updated state to determine a difference between the current state and the updated state;
  identifying parameters that do not match up between the current state and the updated state based on the comparison; and
  determining the parameters to be changed in the current state and what actions or operations are to be taken to synchronize the chain state to the updated state to obtain the plan; and
executing the plan and generating an updated chain state that is used to authorize trades, the updated chain state being generated using the minimum set of operations.

12. The computer program product recited in claim 11, further comprising computer instructions for:
generating a notification in response to a change in information relating to current state information in the current state;
obtaining the current state from the local database in response to the notification, wherein the current state is an approximation of the chain state; and
applying the ruleset to the data extracted from the local database to generate the updated state based at least in part on the notification, wherein the local database is not on the distributed chain database.

* * * * *